(12) United States Patent
Kook et al.

(10) Patent No.: US 10,047,836 B2
(45) Date of Patent: *Aug. 14, 2018

(54) PLANETARY GEAR TRAIN OF AUTOMATIC TRANSMISSION FOR VEHICLES

(71) Applicant: Hyundai Motor Company, Seoul (KR)

(72) Inventors: Jae Chang Kook, Hwaseong-si (KR); Hyun Sik Kwon, Seoul (KR); Wonmin Cho, Hwaseong-si (KR); Seong Wook Hwang, Gunpo-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,273

(22) Filed: Dec. 7, 2016

(65) Prior Publication Data

US 2018/0003270 A1  Jan. 4, 2018

(30) Foreign Application Priority Data

Jun. 30, 2016 (KR) .......................... 10-2016-0082639

(51) Int. Cl.
*F16H 3/66* (2006.01)

(52) U.S. Cl.
CPC ............ *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
CPC .... F16H 3/666; F16H 3/66; F16H 2200/2046; F16H 2200/0065; F16H 2200/2012

(Continued)

(56) References Cited

U.S. PATENT DOCUMENTS 8,409,047 B2   4/2013 Borgerson et al.
8,961,355 B2   2/2015 Hart et al.
(Continued)

FOREIGN PATENT DOCUMENTS

DE   102009028684 A1 * 3/2011 ............... F16H 3/66
JP       2016-098850 A   5/2016
KR   10-2012-0132021 A  12/2012

*Primary Examiner* — Roger L Pang
(74) *Attorney, Agent, or Firm* — Morgan, Lewis & Bockius LLP

(57) ABSTRACT

A planetary gear train of an automatic transmission may include input shaft, output, first planetary gear set having first to third rotational elements, second planetary gear set having fourth to sixth rotational elements, third planetary gear set having seventh to ninth rotational elements, fourth planetary gear set having tenth to twelfth rotational elements, first shaft interconnecting the first and fourth rotational elements, and may be selectively connected with the input shaft or transmission housing, second shaft interconnecting the second rotational element, the sixth rotational element, the seventh rotational element, and the tenth rotational element connect, third shaft connected with the third rotational element, fourth shaft connected with the fifth rotational element, fifth shaft connected with the ninth rotational element, sixth shaft connected with the eighth rotational element and connected with the output shaft, a seventh shaft connected with the eleventh rotational element and connected with the input shaft, and eighth shaft connected with the twelfth rotational element and selectively connected with the respective third shaft and sixth shaft.

10 Claims, 4 Drawing Sheets

(58) Field of Classification Search
USPC .......................................... 475/275–291, 330
See application file for complete search history.

(56) References Cited

U.S. PATENT DOCUMENTS

| | | | | |
|---|---|---|---|---|
| 9,429,215 B2* | 8/2016 | Noh | .......................... | F16H 3/66 |
| 9,810,291 B2* | 11/2017 | Kwon | ........................ | F16H 3/66 |
| 9,816,589 B2* | 11/2017 | Cho | .......................... | F16H 3/66 |
| 2010/0210406 A1* | 8/2010 | Phillips | ..................... | F16H 3/66 |
| | | | | 475/286 |
| 2017/0074374 A1* | 3/2017 | Cho | ......................... | F16H 3/666 |
| 2017/0167574 A1* | 6/2017 | Kook | ........................ | F16H 3/66 |

* cited by examiner

FIG. 2

| Shift-stage | Control element | | | | | | Gear ratio |
|---|---|---|---|---|---|---|---|
| | C1 | C2 | C3 | B1 | B2 | B3 | |
| D1 | | | ● | | ● | ● | 4.261 |
| D2 | | | ● | ● | | ● | 2.714 |
| D3 | ● | | ● | | | ● | 1.900 |
| D4 | ● | ● | | | | ● | 1.360 |
| D5 | ● | ● | | | | | 1.000 |
| D6 | | ● | ● | ● | | | 0.833 |
| D7 | | ● | ● | ● | | | 0.730 |
| D8 | | ● | | ● | ● | | 0.600 |
| D9 | ● | ● | | | ● | | 0.496 |
| REV | ● | | | | ● | ● | -3.610 |

FIG. 4

| Shift-stage | Control element | | | | | | Gear ratio |
|---|---|---|---|---|---|---|---|
| | C1 | C2 | C3 | B1 | B2 | B3 | |
| D1 | | | ● | | ● | ● | 3.857 |
| D2 | | | ● | ● | | ● | 2.429 |
| D3 | ● | | ● | | | ● | 1.714 |
| D4 | ● | ● | | | | ● | 1.298 |
| D5 | ● | ● | | | | | 1.000 |
| D6 | | ● | ● | ● | | | 0.826 |
| D7 | | ● | ● | ● | | | 0.716 |
| D8 | | ● | | | ● | | 0.583 |
| D9 | ● | ● | | | ● | | 0.483 |
| REV | ● | | | | ● | ● | -3.429 |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2016-0082639 filed on Jun. 30, 2016, the entire contents of which are incorporated herein by reference.

BACKGROUND OF THE INVENTION

Field of the Invention

The present invention relates to an automatic transmission for a vehicle. More particularly, the present invention relates to a planetary gear train of an automatic transmission for a vehicle configured for obtaining a power delivery performance improving effect and fuel consumption improving effect by implementing at least advance 9-speed shift-stages by components as small as possible and capable of improving driving silence of the vehicle by using a driving point in a low revolution per minute (RPM) region of an engine.

Description of Related Art

In general, in an automatic transmission field, a research for achievement of more shift-stages has been made as a technology for maximizing enhancement of fuel consumption and drivability of a vehicle, and recently, increase of oil price is triggering a hard competition in enhancing fuel consumption of a vehicle.

In this sense, research for an engine has been made to achieve weight reduction and to enhance fuel consumption by so-called downsizing and research for an automatic transmission has been made to provide better drivability and fuel consumption by achieving more shift-stages.

However, in the case of the automatic transmission, as the number of shift stages is increased, the number of internal parts, particularly, the number of planetary gear sets is increased and a full length of the transmission is increased, thereby causing mountability, production cost, weight, power transfer efficiency, etc., to be deteriorated.

Therefore, it may be important for the automatic transmission to develop a planetary gear train capable of generating maximum efficiency with a small number of parts in order to increase a fuel consumption improvement effect through the achievement of the more shift-stages.

In terms of this, recently, the automatic transmission has been configured to implement a shift of 8-speed or more and has been installed in the vehicle, and research and development for a planetary gear train capable of implementing shift-stages of 8-speed or more have been actively demanded.

However, a general automatic transmission of 8-speed or more generally includes 3 to 4 planetary gear sets and 5 to 6 control elements (friction elements), and in this case, since the full length of the transmission is increased, there is a disadvantage that mountability has no choice but to be deteriorated.

Therefore, in order to achieve the more shift-stages of the automatic transmission, recently, a double row structure in which the planetary gear set is disposed on the planetary gear set is adopted, or a dog clutch is applied instead of a wet control element. However, this case has a problem that an applicable structure is limited, and deterioration of shift sense is accompanied due to the application of the dog clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle configured for obtaining power delivery performance improvement and fuel consumption improving effect through achievement of more shift-stages by implementing at least forward 9-speed shift-stages or more and at least a reverse 1-speed shift-stage or more by components as small as possible and configured for improving driving silence of the vehicle by using a driving point in a low revolution per minute (RPM) region of an engine.

A planetary gear train according to an exemplary embodiment of the present invention may include an input shaft receiving the engine torque, the output shaft outputting a shifted torque, a first planetary gear set having first, second, and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, a first shaft interconnecting the first rotation element and the fourth rotation element, and is selectively connectable with the input shaft or a transmission housing, a second shaft interconnecting the second rotation element, the sixth rotation element, the seventh rotation element, and the tenth rotation element connect, a third shaft connected with the third rotation element, a fourth shaft connected with the fifth rotation element, a fifth shaft connected with the ninth rotation element, a sixth shaft connected with the eighth rotation element and connected with the output shaft, a seventh shaft connected with the eleventh rotation element and connected with the input shaft, and an eighth shaft connected with the twelfth rotation element and selectively connectable with the respective third shaft and sixth shaft.

The respective fourth shaft and fifth shaft may be selectively connectable with transmission housing.

In addition, the first, second, and third rotation element of the first planetary gear set may be respectively a first sun gear, a first planet carrier, and a first ring gear of the first planetary gear set, the fourth, fifth, and sixth rotation element of the second planetary gear set may be respectively a second sun gear, a second planet carrier, and a second ring gear of the second planetary gear set, the seventh, eighth, and ninth rotation elements of the third planetary gear set may be respectively a third sun gear, a third ring gear, and a third planet carrier of the third planetary gear set, and the tenth, eleventh, and twelfth rotation elements of the fourth planetary gear set may be respectively a fourth sun gear, a fourth planet carrier, and a fourth ring gear of the fourth planetary gear set.

On the other hand, the first, second, and third rotation element of the first planetary gear set may be respectively a first sun gear, a first planet carrier, and a first ring gear of the first planetary gear set, the fourth, fifth, and sixth rotation element of the second planetary gear set may be respectively a second sun gear, a second planet carrier, and a second ring gear of the second planetary gear set, the seventh, eighth, and ninth rotation elements of the third planetary gear set may be respectively a third sun gear, a third planet carrier, and a third ring gear of the third planetary gear set, and the tenth, eleventh, and twelfth rotation elements of the fourth planetary gear set may be respectively a fourth sun gear, a fourth planet carrier, and a fourth ring gear of the fourth planetary gear set.

The planetary gear train may further include a first clutch selectively connecting the first shaft and the input shaft, a second clutch selectively connecting the sixth shaft and the eighth shaft, a third clutch selectively connecting the third shaft and the eighth shaft, a first brake selectively connecting the first shaft to the transmission housing, a second brake selectively connecting the fourth shaft to the transmission housing, and a third brake selectively connecting the fifth shaft to the transmission housing.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in a planetary gear train according to various exemplary embodiments of the present invention.

FIG. 4 is an operational chart for respective control elements at respective shift-stages in a planetary gear train according to various exemplary embodiments of the present invention.

Figure 1:
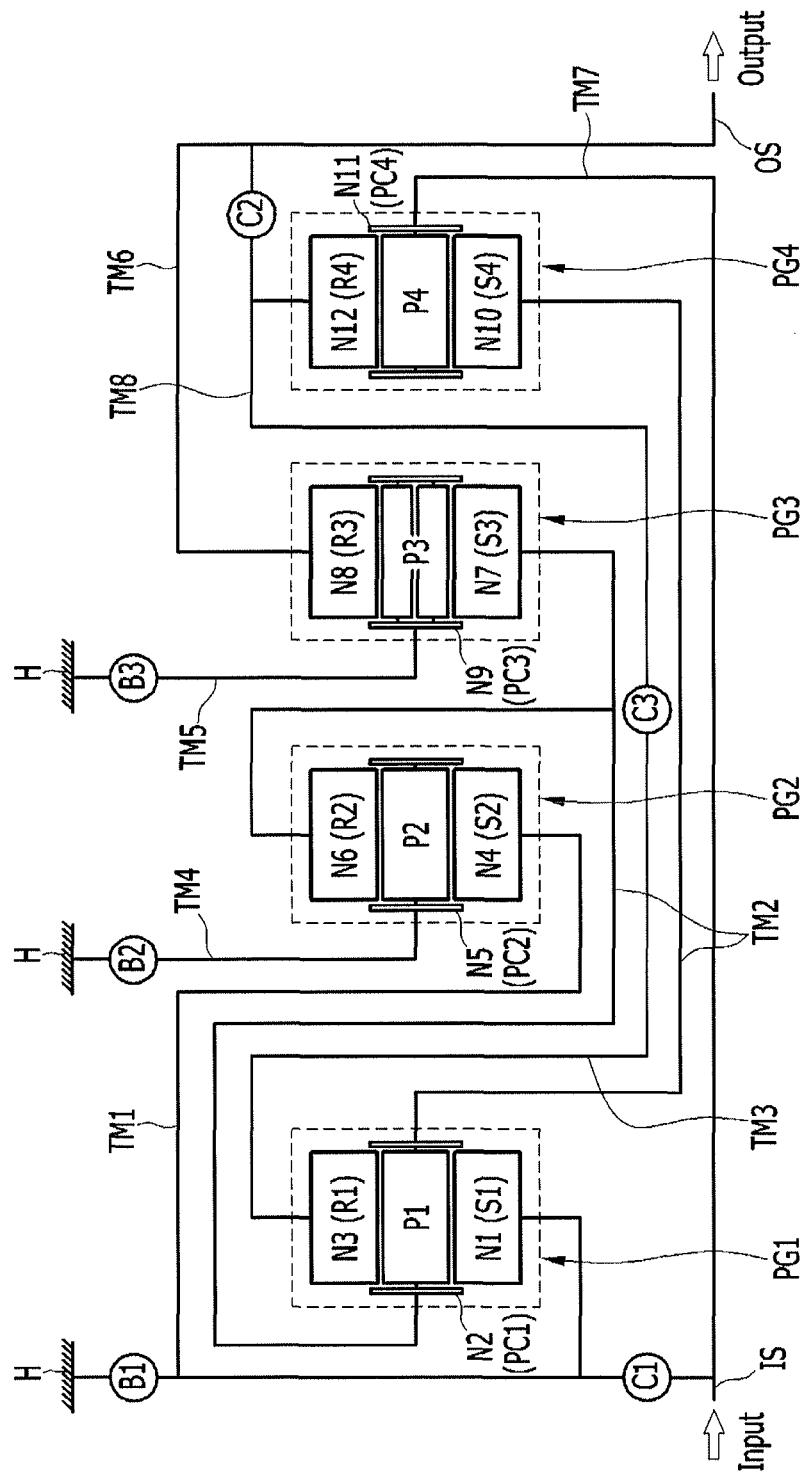
FIG. 1 is a schematic diagram of a planetary gear train according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be may be intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to various exemplary embodiments of the present invention.

Referring to FIG. 1, a planetary gear train according to various exemplary embodiments of the present invention includes first, second, third, and four planetary gear sets PG1, PG2, PG3, and PG4 arranged on a same axis, an input shaft IS, an output shaft OS, eight shafts TM1 to TM8 interconnecting rotation elements of the first, second, third, and four planetary gear sets PG1, PG2, PG3, and PG4, three clutches C1 to C3 and three brakes B1 to B3 as control elements, and a transmission housing H.

Torque input from the input shaft IS is shifted by cooperative operation of the first, second, third, and fourth planetary gear sets PG1, PG2, PG3, and PG4, and then output through the output shaft OS.

Herein, the planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS, which is an output element, is positioned on a same axis as an axis on which the input shaft IS is positioned and transfers shifted driving force to a drive shaft through a differential apparatus.

The first planetary gear set PG1 is a single pinion planetary gear set, and includes a first sun gear S1, a first planet carrier PC1 that supports a first pinion gear P1 externally engaged with the first sun gear S1, and a first ring gear R1 that is internally engaged with the first pinion gear P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports a second pinion gear P2 externally engaged with the second sun gear S2, and a second ring gear R2 that is internally engaged with the second pinion gear P2. The second sun gear S2 acts as a fourth rotation element N4, the second planet carrier PC2 acts as a fifth rotation element N4, and the second ring gear R2 acts as a sixth rotation element N6.

The third planetary gear set PG3 is a double pinion planetary gear set, and includes a third sun gear S3, a third ring gear R3 that is internally engaged with an external pinion gear of a pair of third pinion P3 externally engaged with the second sun gear S2, a third planet carrier PC3 that supports the third pinion P3 externally engaged with the third sun gear S3. The third sun gear S3 acts as a seventh rotation element N7, the third ring gear R3 acts as an eighth rotation element N8, and the third planet carrier PC3 acts as a ninth rotation element N9.

The fourth planetary gear set PG4 is a single pinion planetary gear set, and includes a fourth sun gear S4, a fourth planet carrier PC4 that supports a fourth pinion gear P4 externally engaged with the fourth sun gear S4, and a fourth ring gear R4 that is internally engaged with the fourth pinion gear P4. The fourth sun gear S4 acts as a tenth rotation element N10, the fourth planet carrier PC4 acts as a eleventh rotation element N11, and the fourth ring gear R4 acts as a twelfth rotation element N12.

Herein, In the arrangement of the first, second, third, and fourth planetary gear sets PG1, PG2, PG3, and PG4, the first rotation element N1 is directly connected with the fourth rotation element N4, and the second rotation element N2 is directly connected with the sixth rotation element N6, the seventh rotation element N7, and the tenth rotation element N10, by eight shafts TM1 to TM8.

The eight shafts TM1 to TM8 are arranged as follows.

Each of the eight shafts TM1 to TM8 may be rotation members transferring power while being rotated together with the rotation elements connected to directly connect or selectively connect a plurality of rotation elements, among the rotation elements of the planetary gear sets PG1, PG2, PG3, and PG4, and may be fixed members directly connecting the rotation element to the transmission housing H so that the rotation element is fixed to the transmission housing H.

The first shaft TM1 directly connects T the first rotation element N1 (the first sun gear S1) and the fourth rotation element N4 (the second sun gear S2), and is selectively connectable with the input shaft IS to selectively act as an input element or selectively connectable with the transmission housing H to selectively act as a fixed element.

The second shaft TM2 directly connects the second rotation element N2 (the first planet carrier PC1), the sixth rotation element N6 (the second ring gear R2), the seventh rotation element N7 (the third sun gear S3), and the tenth rotation element N10 (the fourth sun gear S4).

The third shaft TM3 is directly connected with the third rotation element N3 (the first ring gear R1).

The fourth shaft TM4 is directly connected with the fifth rotation element N5 (the second planet carrier PC2), and selectively connectable with the transmission housing H, selectively acting as a fixed element.

The fifth shaft TM5 is directly connected with the ninth rotation element N9 (the third planet carrier PC3), and selectively connectable with the transmission housing H, selectively acting as a fixed element.

The sixth shaft TM6 is directly connected with the eighth rotation element N8 (the third ring gear R3), and directly connected with the output shaft OS, thereby always acting as an output element.

The seventh shaft TM7 is directly connected with the eleventh rotation element N11 (the fourth planet carrier PC4), and directly connected with the input shaft IS, continuously acting as an input element.

The eighth shaft TM8 is directly connected with the twelfth rotation element N12 (the fourth ring gear R4), and selectively connectable with the respective third shaft TM3 and sixth shaft TM6.

The eight shafts TM1 to TM8, the input shaft IS, and the output shaft OS may be selectively interconnected with one another by control elements of three clutches C1, C2, and C3.

The eight shafts TM1 to TM8 may be selectively connectable with the transmission housing H, by control elements of three brakes B1, B2, and B3.

The three clutches C1 to C3 and the three brakes B1 to B3 are arranged as follows.

The first clutch C1 is positioned between the input shaft IS and the first shaft TM1, and selectively connects the input shaft IS and the first shaft TM1, controlling power delivery therebetween.

The second clutch C2 is positioned between the sixth shaft TM6 and the eighth shaft TM8, and selectively connects the sixth shaft TM6 and the eighth shaft TM8, controlling power delivery therebetween.

The third clutch C3 is positioned between the third shaft TM3 and the eighth shaft TM8, and selectively connects the third shaft TM3 and the eighth shaft TM8, controlling power delivery therebetween.

The first brake B1 is positioned between the first shaft TM1 and the transmission housing H, and selectively connects the first shaft TM1 to the transmission housing H.

The second brake B2 is positioned between the fourth shaft TM4 and the transmission housing H, and selectively connects the fourth shaft TM4 to the transmission housing H.

The third brake B3 is positioned between the fifth shaft TM5 and the transmission housing H, and selectively connects the fifth shaft TM5 to the transmission housing H.

Referring to FIG. 1, as the first clutch C1 and the first brake B1 are control elements to connect the first shaft TM1 with the respective input shaft IS and transmission housing H, the first clutch C1 and the first brake B1 are not operated together at respective shift-stages.

The respective control elements of the first, second, and third clutches C1, C2, and C3 and the first, second, and third brakes B1, B2, and B3 may be realized as multi-plate hydraulic pressure friction devices that are frictionally engaged by hydraulic pressure.

FIG. 2 is an operational chart for respective control elements at respective shift-stages in a planetary gear train according to various exemplary embodiments of the present invention.

Referring to FIG. 2, a planetary gear train according to various exemplary embodiments of the present invention realizes nine forward speeds and one reverse speed by operating three control elements among the first, second, and third clutches C1, C2, and C3 and the first, second, and third brakes B1, B2, and B3 at respective shift-stages.

In the first forward speed shift-stage D1, the third clutch C3 and the second and third brakes B2 and B3 are operated.

On a state that the third shaft TM3 and the eighth shaft TM8 are connected with each other by the operation of the third clutch C3, the torque of the input shaft IS is input to the seventh shaft TM7. In addition, the fourth shaft TM4 and the fifth shaft TM5 act as fixed elements by the operation of the second and third brakes B2 and B3, realizing the first forward speed and outputting a shifted torque to the output shaft OS connected with the sixth shaft TM6.

In the second forward speed shift-stage D2, the third clutch C3 and the first and third brakes B2 and B3 are operated.

On a state that the third shaft TM3 and the eighth shaft TM8 are connected with each other by the operation of the third clutch C3, the torque of the input shaft IS is input to the seventh shaft TM7. In addition, the first shaft TM1 and the fifth shaft TM5 act as fixed elements by the operation of the first and third brakes B2 and B3, realizing the second forward speed and outputting a shifted torque to the output shaft OS connected with the sixth shaft TM6.

In the third forward speed shift-stage D3, the first and third clutches C1 and C3 and the third brake B3 are operated.

On a state that the first shaft TM1 and the input shaft IS are connected with each other by the operation of the first clutch C1 and the third shaft TM3 and the eighth shaft TM8 are connected with each other by the operation of the third clutch C3, the torque of the input shaft IS is input to the first shaft TM1 and the seventh shaft TM7. In addition, the fifth shaft TM5 acts as a fixed element by the operation of the third brake B3, realizing the third forward speed and outputting a shifted torque to the output shaft OS connected with the sixth shaft TM6.

In the forward fourth speed shift-stage D4, the first clutch and the second clutch C1 and C2 and the third brake B3 are operated.

On a state that the first shaft TM1 and the input shaft IS are connected with each other by the operation of the first clutch C1 and the sixth shaft TM6 and the eighth shaft TM8 are connected with each other by the operation of the second clutch C2, the torque of the input shaft IS is input to the first shaft TM1 and the seventh shaft TM7. In addition, the fifth shaft TM5 acts as a fixed element by the operation of the third brake B3, realizing the forward fourth speed and outputting a shifted torque to the output shaft OS connected with the sixth shaft TM6.

In the fifth forward speed shift-stage D5, the first, second, and third clutches C1, C2, and C3 are operated.

On a state that the first shaft TM1 and the input shaft IS are connected with each other by the operation of the first clutch C1, the sixth shaft TM6 and the eighth shaft TM8 are connected with each other by the operation of the second clutch C2, and the third shaft TM3 and the eighth TM8 are connected with each other by the operation of the third clutch C3, the torque of the input shaft IS is input to the first shaft TM1 and the seventh shaft TM7. In addition, the first, second, third, and fourth planetary gear sets PG1, PG2, PG3, and PG4 are integrally rotated together, realizing the fifth forward speed that outputs an input as it and outputting a shifted torque to the output shaft OS connected with the sixth shaft TM6.

In the forward sixth forward speed shift-stage D6, the second and third clutches C2 and C3 and the first brake B1 are operated.

On a state that the sixth shaft TM6 and the eighth shaft TM8 are connected with each other by the operation of the second clutch C2 and the third shaft TM3 and the eighth TM8 are connected with each other by the operation of the third clutch C3, the torque of the input shaft IS is input to the seventh shaft TM7. In addition, the first shaft TM1, the fourth shaft TM4, and the fifth shaft TM5 act as fixed elements by the operation of the first, second, and third brakes B1, B2, and B3, realizing the forward sixth forward speed and outputting a shifted torque to the output shaft OS connected with the sixth shaft TM6.

In the seventh forward speed shift-stage D7, the second and third clutches C2 and C3 and the second brake B2 are operated.

On a state that the sixth shaft TM6 and the eighth shaft TM8 are connected with each other by the operation of the second clutch C2 and the third shaft TM3 and the eighth TM8 are connected with each other by the operation of the third clutch C3, the torque of the input shaft IS is input to the seventh shaft TM7. In addition, the fourth shaft TM4 acts as a fixed element by the operation of the second brake B2, realizing the seventh forward speed and outputting a shifted torque to the output shaft OS connected with the sixth shaft TM6.

In the eighth forward speed shift-stage D8, the second clutch C2 and the first and second brakes B1 and B2 are operated.

On a state that the sixth shaft TM6 and the eighth shaft TM8 are connected with each other by the operation of the second clutch C2, the torque of the input shaft IS is input to the seventh shaft TM7. In addition, the first shaft TM1 and the fourth shaft TM4 act as fixed elements by the operation of the first and second brakes B1 and B2, realizing the eighth forward speed and outputting a shifted torque to the output shaft OS connected with the sixth shaft TM6.

In the ninth forward speed shift-stage D9, the first clutch and the second clutch C1 and C2 and the second brake B2 are operated.

On a state that the first shaft TM1 and the input shaft IS are connected with each other by the operation of the first clutch C1 and the sixth shaft TM6 and the eighth shaft TM8 are connected with each other by the operation of the second clutch C2, the torque of the input shaft IS is input to the first shaft TM1 and the seventh shaft TM7. In addition, the fourth shaft TM4 acts as a fixed element by the operation of the second brake B2, realizing the ninth forward speed and outputting a shifted torque to the output shaft OS connected with the sixth shaft TM6.

In the reverse speed shift-stage REV, the first clutch C1 and the second and third brakes B2 and B3 are operated.

On a state that the first shaft TM1 and the input shaft IS are connected with each other by the operation of the first clutch C1, the torque of the input shaft IS is input to the first shaft TM1 and the seventh shaft TM7. In addition, the fourth shaft TM4 and the fifth shaft TM5 act as fixed elements by the operation of the second and third brakes B2 and B3, realizing the reverse speed and outputting a shifted torque to the output shaft OS connected with the sixth shaft TM6.

Figure 3:
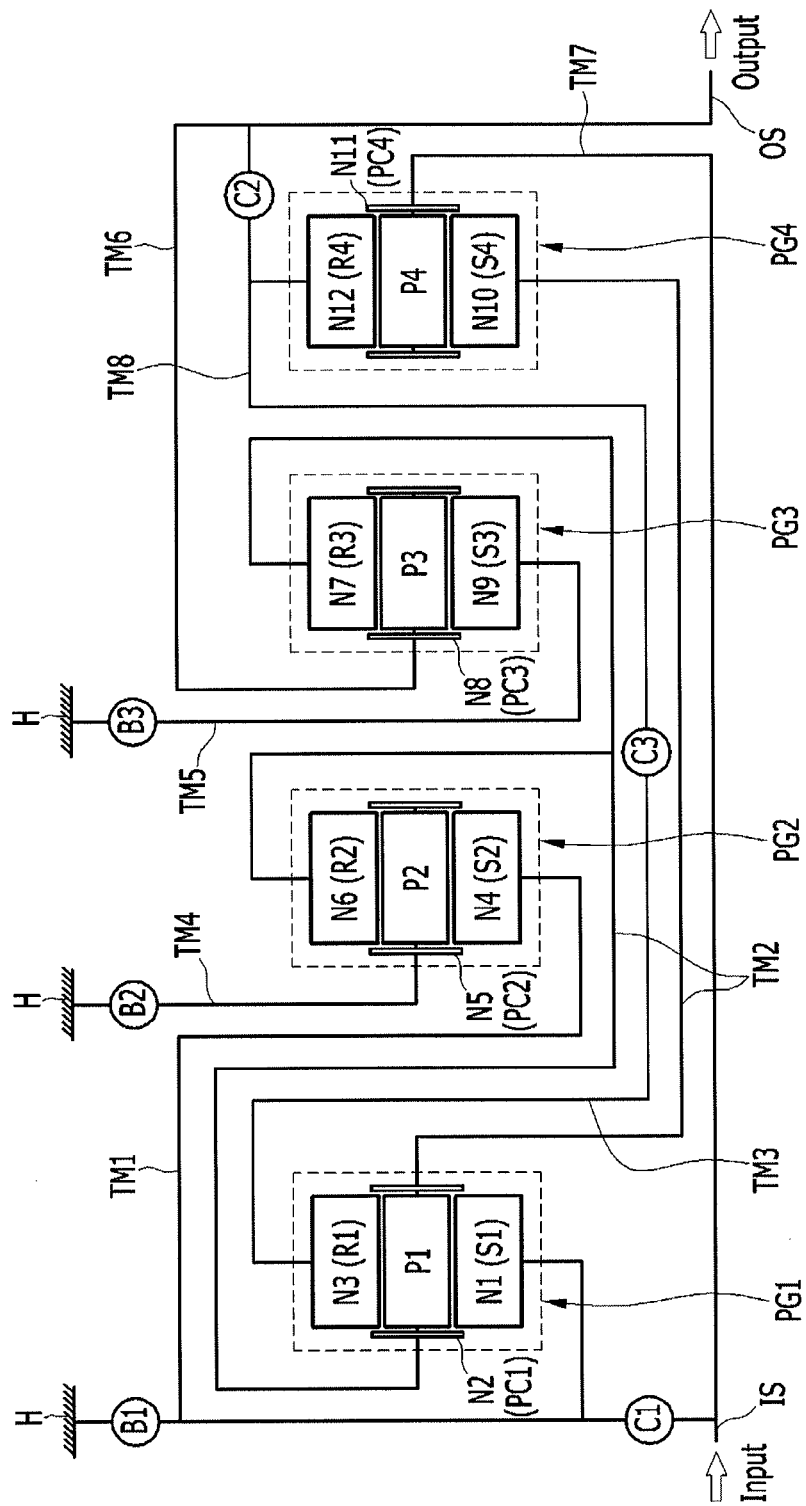
FIG. 3 is a schematic diagram of a planetary gear train according to various exemplary embodiments of the present invention.

FIG. 3 is a schematic diagram of a planetary gear train according to various exemplary embodiments of the present invention, and FIG. 4 is an operational chart for respective control elements at respective shift-stages in a planetary gear train according to various exemplary embodiments of the present invention.

Referring to FIG. 1 and FIG. 3, according to the various exemplary embodiments, the third planetary gear set PG3 is a double pinion planetary gear set which is configured so that the third sun gear S3 acts as a seventh rotation element N7, the third ring gear R3 acts as an eighth rotation element N8, and the third planet carrier PC3 acts as a ninth rotation element N9, but according to the various exemplary embodiments, the third planetary gear set PG3 is a single pinion planetary gear set which is configured so that the third sun gear S3 acts as a seventh rotation element N7, the third planet carrier PC3 acts as an eighth rotation element N8, and the third ring gear R3 acts as a ninth rotation element N9.

The various exemplary embodiments is configured so that the third planetary gear set PG3 is only changed from a double pinion planetary gear set to a single pinion planetary gear set in comparison with the various exemplary embodiments, and the connection between the eight shafts TM1 to TM8, the three clutches C1 to C3, and the three brakes B1 to B3 and the entire operation and effect of the planetary gear train are same to the various exemplary embodiments, so the detail description thereof will be omitted.

Referring to FIG. 2 and FIG. 4, an operational chart for respective control elements at respective shift-stages in a planetary gear train according to the various exemplary embodiments of the present invention is also same to the various exemplary embodiments. Meanwhile, the gear ratios are different, but the entire operation and effect of the planetary gear train is not largely influenced by the difference, so the detail description of the gear ratios will be omitted.

As described above, a planetary gear train according to the first and various exemplary embodiments of the present invention may realize at least nine forward speeds and at least one reverse speed formed by operating four planetary gear sets PG1, PG2, and PG3, and PG4 by controlling three clutches C1, C2, and C3 and three brakes B1, B2, and B3.

In addition, the planetary gear train according to an exemplary embodiment of the present invention may implement the shift-stage suitable for the revolution per minute of the engine and maximize driving efficiency of the engine by achieving the more shift-stage of the automatic transmission. Further, the linearity of step ratios of shift stages is secured while multi-staging the shift stage with high efficiency, thereby making it possible to improve drivability such as acceleration before and after a shift, an engine speed rhythmic sense, and the like.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving an engine torque;
    an output shaft outputting a shifted torque;
    a first planetary gear set having first, second, and third rotation elements;
    a second planetary gear set having fourth, fifth, and sixth rotation elements;
    a third planetary gear set having seventh, eighth, and ninth rotation elements;
    a fourth planetary gear set having tenth, eleventh, and twelfth rotation elements;
    a first shaft interconnecting the first rotation element and the fourth rotation element, and is selectively connectable with the input shaft or a transmission housing;
    a second shaft interconnecting the second rotation element, the sixth rotation element, the seventh rotation element, and the tenth rotation element;
    a third shaft connected with the third rotation element;
    a fourth shaft connected with the fifth rotation element;
    a fifth shaft connected with the ninth rotation element;
    a sixth shaft connected with the eighth rotation element and connected with the output shaft;
    a seventh shaft connected with the eleventh rotation element and connected with the input shaft; and
    an eighth shaft connected with the twelfth rotation element and selectively connectable with the respective third shaft and sixth shaft.

2. The planetary gear train of claim 1, wherein the respective fourth shaft and fifth shaft are selectively connectable with transmission housing.

3. The planetary gear train of claim 1, wherein
    the first, second, and third rotation element of the first planetary gear set are respectively a first sun gear, a first planet carrier, and a first ring gear of the first planetary gear set;
    the fourth, fifth, and sixth rotation element of the second planetary gear set are respectively a second sun gear, a second planet carrier, and a second ring gear of the second planetary gear set;
    the seventh, eighth, and ninth rotation elements of the third planetary gear set are respectively a third sun gear, a third ring gear, and a third planet carrier of the third planetary gear set; and
    the tenth, eleventh, and twelfth rotation elements of the fourth planetary gear set are respectively a fourth sun gear, a fourth planet carrier, and a fourth ring gear of the fourth planetary gear set.

4. The planetary gear train of claim 1, wherein
    the first, second, and third rotation element of the first planetary gear set are respectively a first sun gear, a first planet carrier, and a first ring gear of the first planetary gear set;
    the fourth, fifth, and sixth rotation element of the second planetary gear set are respectively a second sun gear, a second planet carrier, and a second ring gear of the second planetary gear set;
    the seventh, eighth, and ninth rotation elements of the third planetary gear set are respectively a third sun gear, a third planet carrier, and a third ring gear of the third planetary gear set; and
    the tenth, eleventh, and twelfth rotation elements of the fourth planetary gear set are respectively a fourth sun gear, a fourth planet carrier, and a fourth ring gear of the fourth planetary gear set.

5. The planetary gear train of claim 2, further including:
    a first clutch selectively connecting the first shaft and the input shaft;
    a second clutch selectively connecting the sixth shaft and the eighth shaft;
    a third clutch selectively connecting the third shaft and the eighth shaft;
    a first brake selectively connecting the first shaft to the transmission housing;
    a second brake selectively connecting the fourth shaft to the transmission housing; and
    a third brake selectively connecting the fifth shaft to the transmission housing.

6. A planetary gear train of an automatic transmission for a vehicle, comprising:
    an input shaft receiving an engine torque;
    an output shaft outputting a shifted torque;
    a first planetary gear set having first, second, and third rotation elements;
    a second planetary gear set having fourth, fifth, and sixth rotation elements;
    a third planetary gear set having seventh, eighth, and ninth rotation elements; and
    a fourth planetary gear set having tenth, eleventh, and twelfth rotation elements,
    wherein
    the input shaft is connected with the eleventh rotation element;
    the output shaft is connected with the eighth rotation element;

the first rotation element is connected with the fourth rotation element, and selectively connectable with the input shaft or the transmission housing;

the second rotation element is connected with the sixth rotation element, the seventh rotation element, and the tenth rotation element;

the third rotation element is selectively connectable with the twelfth rotation element; and the eighth rotation element is selectively connectable with the twelfth rotation element.

7. The planetary gear train of claim 6, wherein the fifth rotation element and the ninth rotation element are selectively connectable with the transmission housing.

8. The planetary gear train of claim 6, wherein the first, second, and third rotation element of the first planetary gear set are respectively a first sun gear, a first planet carrier, and a first ring gear of the first planetary gear set;

the fourth, fifth, and sixth rotation element of the second planetary gear set are respectively a second sun gear, a second planet carrier, and a second ring gear of the second planetary gear set;

the seventh, eighth, and ninth rotation elements of the third planetary gear set are respectively a third sun gear, a third ring gear, and a third planet carrier of the third planetary gear set; and the tenth, eleventh, and twelfth rotation elements of the fourth planetary gear set are respectively a fourth sun gear, a fourth planet carrier, and a fourth ring gear of the fourth planetary gear set.

9. The planetary gear train of claim 6, wherein the first, second, and third rotation element of the first planetary gear set are respectively a first sun gear, a first planet carrier, and a first ring gear of the first planetary gear set;

the fourth, fifth, and sixth rotation element of the second planetary gear set are respectively a second sun gear, a second planet carrier, and a second ring gear of the second planetary gear set;

the seventh, eighth, and ninth rotation elements of the third planetary gear set are respectively a third sun gear, a third planet carrier, and a third ring gear of the third planetary gear set; and the tenth, eleventh, and twelfth rotation elements of the fourth planetary gear set are respectively a fourth sun gear, a fourth planet carrier, and a fourth ring gear of the fourth planetary gear set.

10. The planetary gear train of claim 7, further including:

a first clutch selectively connecting the first rotation element and the input shaft;

a second clutch selectively connecting the eighth rotation element and the twelfth rotation element;

a third clutch selectively connecting the third rotation element and the twelfth rotation element;

a first brake selectively connecting the first rotation element to the transmission housing;

a second brake selectively connecting the fifth rotation element to the transmission housing; and a third brake selectively connecting the ninth rotation element to the transmission housing.

* * * * *